United States Patent [19]
Kelly

[11] Patent Number: 5,957,397
[45] Date of Patent: Sep. 28, 1999

[54] METHOD FOR HANDLING MERCURY CONTAINING LAMPS

[75] Inventor: Laurence C. Kelly, Park Ridge, Ill.

[73] Assignee: MAG Patent, Inc., Addison, Ill.

[21] Appl. No.: 09/072,094

[22] Filed: May 4, 1998

Related U.S. Application Data

[60] Provisional application No. 60/045,432, May 2, 1997.

[51] Int. Cl.$^6$ ...................................................... B02C 1/00
[52] U.S. Cl. ...................... 241/19; 241/24.13; 241/24.22; 241/27; 241/79.1
[58] Field of Search ................................ 241/30, 99, 100, 241/37.5, 101.71, 101.73, 101.74, DIG. 14, 79.1, 33, DIG. 38, 24.1, 24.12, 24.13, 24.22, 27, 19; 95/134; 96/131

[56] References Cited

U.S. PATENT DOCUMENTS

| | | | |
|---|---|---|---|
| 2,593,657 | 4/1952 | Coon et al. | 241/47 |
| 2,628,036 | 2/1953 | Hall | 241/47 |
| 2,866,604 | 12/1958 | Hall | 241/99 |
| 3,713,776 | 1/1973 | Capuano | 422/62 |
| 3,913,849 | 10/1975 | Atansoff et al. | 241/55 |
| 3,924,219 | 12/1975 | Braun | 338/34 |
| 4,545,540 | 10/1985 | Nakamura | 241/99 |
| 4,655,404 | 4/1987 | Deklerow | 241/99 |
| 4,737,173 | 4/1988 | Kudirka et al. | 96/131 |
| 5,092,527 | 3/1992 | Perry et al. | 241/19 |
| 5,169,419 | 12/1992 | Mori et al. | 96/117.5 |
| 5,492,278 | 2/1996 | Raboin | 241/57 |
| 5,586,730 | 12/1996 | Mortrud | 241/24.22 |
| 5,636,800 | 6/1997 | Wolf | 241/14 |
| 5,743,473 | 4/1998 | Gregg | 241/33 |

FOREIGN PATENT DOCUMENTS

| | | | |
|---|---|---|---|
| 248198 | 12/1987 | Germany | 241/99 |

OTHER PUBLICATIONS

40 CFR Parts 9, 260, 261, 262, 264, 265, 266, 268, 270 and 273 dated May 11, 1995.

*Primary Examiner*—Joseph J. Hail, III
*Assistant Examiner*—Susan R. Kingsbury
*Attorney, Agent, or Firm*—John W. Harbst

[57] ABSTRACT

A process for economically handling spent mercury containing lamps in an efficient manner while protecting the environment against the release of mercury vapors into the atmosphere along with creation of non-toxic recyclable by-product materials therefrom is disclosed. The process includes the steps of: transporting a lamp crushing apparatus on a mobile vehicle to a site whereat mercury containing lamps are collected; loading the mercury containing lamps within a closed chamber defined by the lamp crushing apparatus; and, crushing the mercury containing lamps within the closed chamber while simultaneously extracting substantially all hazardous mercury vapors from the closed chamber during the crushing process to create non-toxic recyclable by-product materials from the lamps loaded into the closed chamber. Preferably, the process of the present invention furthermore includes the step of monitoring and measuring levels of mercury vapors within the enclosure on the vehicle at least during crushing of the mercury containing lamps within the closed chamber.

31 Claims, 9 Drawing Sheets

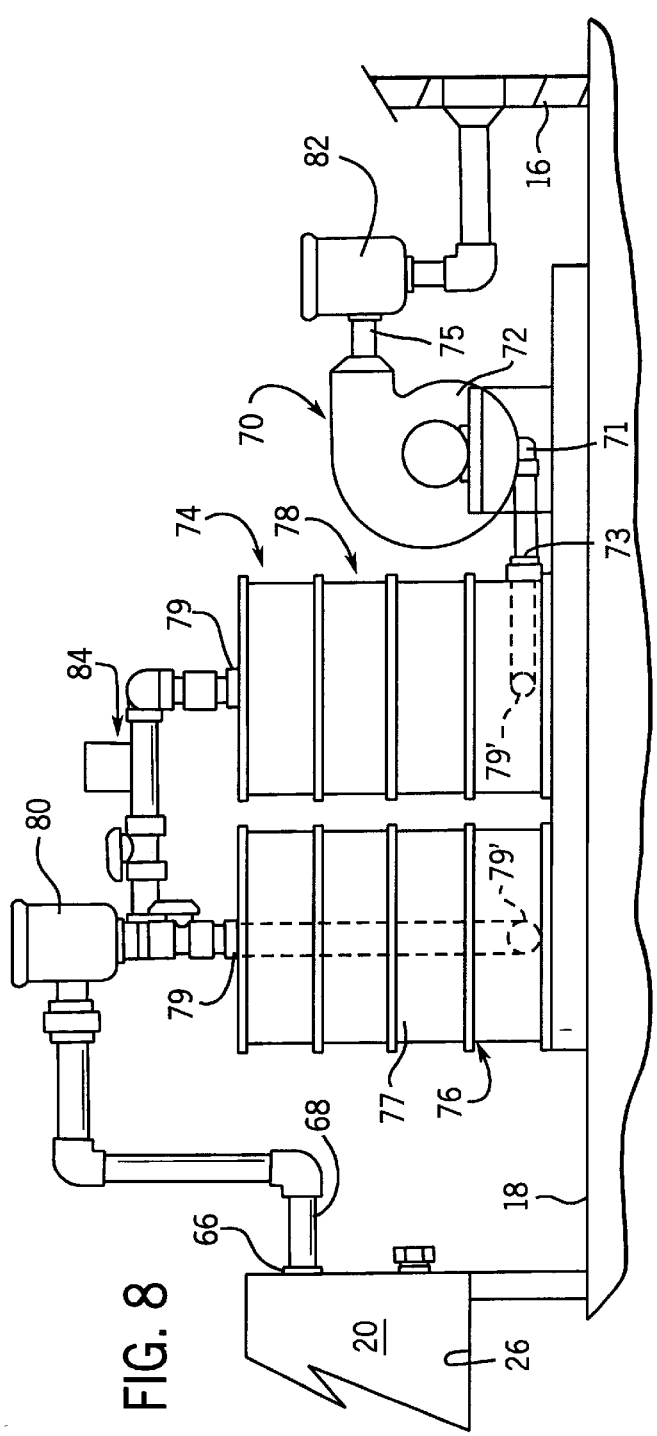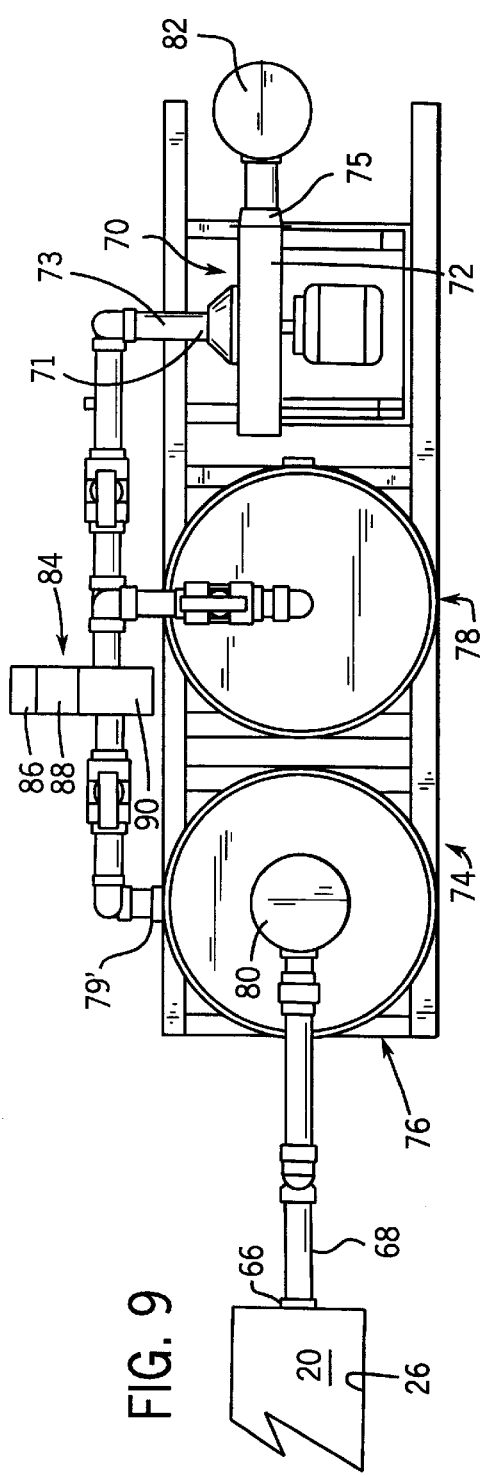

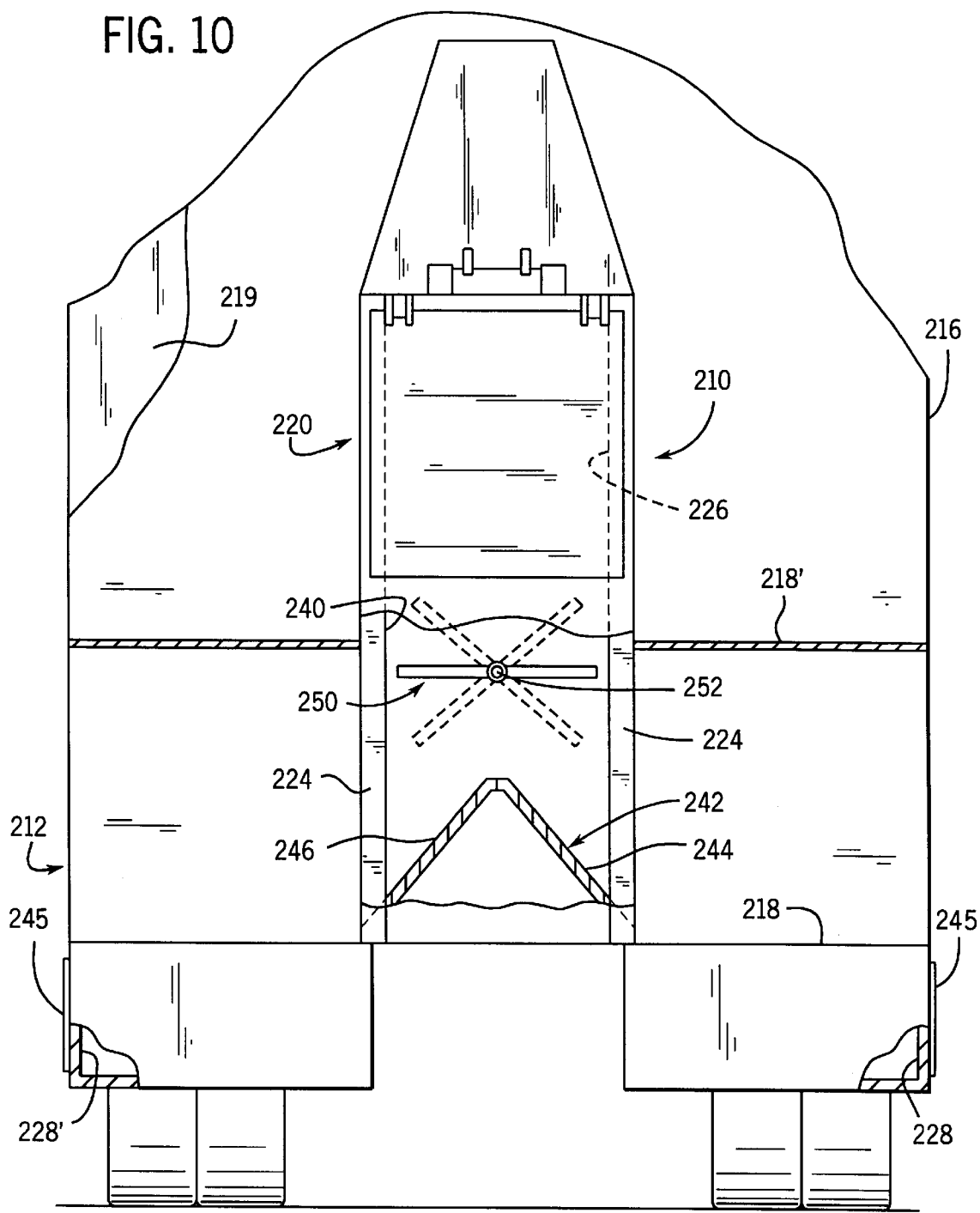

METHOD FOR HANDLING MERCURY CONTAINING LAMPS

This application claims benefit of provisional Application No. 60/045,432 filed May 2, 1997.

FIELD OF THE INVENTION

The present invention generally relates to mercury containing lamps and bulbs and, more particularly, to an apparatus and method for economically and efficiently handling of lamps and bulbs containing mercury in an environmentally acceptable process.

BACKGROUND OF THE INVENTION

Mercury containing lamps, such as fluorescent lamps, are widely used in schools, factories, office buildings, shopping centers and other large buildings. Such buildings normally have a bulb replacement program as part of their normal maintenance. As will be appreciated, such programs often involve replacing all the lamps in a particular area of the building or, in some circumstances, throughout an entire building or complex.

Both state and federal governments are very concerned over the disposal of spent lamps containing mercury. Current lamp crushing techniques allow the mercury vapor contained in spent lamps to be released into the atmosphere, thus, causing significant environmental damage. When lamps are disposed of in landfills or the like, residual mercury often leaches into the ground.

In view of the above, the United States Environmental Protection Agency has recently enacted legislation preventing spent lamps containing mercury from being disposed of at landfills. Substantial penalties have been enacted to prevent illegal disposal of spent lamps containing mercury such as flourescent lamps. If a landfill is discovered to have mercury containing lamps in their waste, any user of that landfill is considered a potential responsible party (PRP). Under current regulations, any PRP (no matter how large or small) would be liable for the closure of the failed landfill. This responsibility can equate to hundreds of thousands of dollars to a single generator of potentially hazardous material.

As will be appreciated, disposal of spent mercury containing lamps poses a significant problem for those buildings or facilities which tend to be large users of such mercury containing lamps. Heretofore, lamp disposal has been treated as any other waste. That is, it has been necessary for these larger facilities to contract with an organization which would manifest the spent lamps at the location where they are generated, followed by packaging and transporting them to a central processing facility where the spent lamps could be destroyed in a controlled environment. The costs of the paperwork, as well as the processing required to be used to properly dispose of mercury containing lamps in a controlled environment has a significant economic disadvantage associated therewith. As will be appreciated, transporting a large volume of spent lamps to a central processing facility essentially amounts to the transportation of air several hundred miles in most instances.

Because mercury containing lamps come in a wide variety of sizes and shapes, the need and ability to transport the spent lamps to a central processing facility also involves significant handling costs and equipment for insuring against breakage of the lamps during the transportation process. Transportation of spent lamps, sometimes several hundreds of miles, inevitably leads to breakage of some of the lamps along the way and, thus, the release of potentially toxic mercury vapors into the atmosphere. Moreover, some states require a licensed hazardous waste hauler to ship the spent bulbs from the facility whereat the lamps are removed to the central processing facility. Requiring a hazardous waste hauler to move what essentially is air sometimes hundreds of mile can lead to a significant economic problem.

Thus there remains a need and a desire for an apparatus and method for destroying mercury containing lamps which is both efficient and economical and, yet, satisfies environmental concerns when the spent lamps are destroyed by creating a product rather than a waste.

SUMMARY OF THE INVENTION

In view of the above, one aspect of the present invention relates to an apparatus for economically handling mercury containing lamps in an efficient manner while protecting the environment against release of mercury vapors into the atmosphere. In one form, the apparatus of the present invention includes a mobile vehicle which is transportable to a facility or site where the mercury containing lamps to be recycled are located, a mechanism mounted within an enclosure on the mobile vehicle for receiving and destroying the mercury containing lamps therewithin, and an apparatus for sensing mercury vapor levels within the enclosure of the vehicle. The terms "destroying" or "destruction" as used herein means rendering the spent mercury containing lamps innocuous and creates reusable materials.

In accordance with the present invention, the vehicle on which the mechanism for destroying mercury containing lamps is mounted is moved to a site or facility at which the spent or burned out lamps are located. The spent lamps are accumulated on site at the facility as the lamps burn out or are replaced thereby reducing the paperwork and handling of the spent lamps. Moreover, driving the lamp destruction mechanism to the site where the lamps are generated and stored eliminates many—if not all—the transportation problems discussed above.

In a preferred form of the invention, the enclosure on the vehicle includes a multi-walled structure arranged in surrounding relation relative to the lamp destruction apparatus. The enclosure further includes a door movable between open and closed positions. When the door is closed, the lamp destruction apparatus is operably separated from the atmosphere outside the enclosure on the vehicle.

The lamp destruction mechanism preferably includes a housing wherein mercury containing lamps are received and destroyed, a filter apparatus for trapping mercury vapors from gases passed therethrough, and an air handling unit. In a most preferred form, the lamp destruction apparatus of the present invention operates under the influence of a negative pressure or vacuum. Research has revealed that anything airborne will be drawn into and toward a negative source of air. Accordingly, when the lamps are crushed inside the vacuum chamber of the destruction apparatus, mercury vapors are positively drawn or entrained within a negative air stream thus preventing their escapement from the lamp destruction or crushing apparatus and thereby preventing any potential emissions to the atmosphere. In a most preferred form of the invention, the door to the enclosure is latched in a position such that it remains slightly open during a lamp destruction process such that ambient air from outside the enclosure is drawn into the enclosure to enhance the quality of air within the enclosure on the vehicle.

The housing of the destruction apparatus wherein the mercury containing lamps are destroyed preferably includes a first chamber wherein a vacuum is created during the lamp destruction process and a second chamber arranged in material receiving relation relative to said first chamber. As such, the processed particulates of glass and metal ends caps resulting from the destruction of the mercury containing lamps pass from the first chamber to the second chamber of the housing where they are held as non-hazardous raw material. Doors are provided on the housing to promote access to the interior of the housing.

The broken glass is collected within the receptacle and subsequently resold for use in other applications. For example, the crushed glass can be used in asphalt batching facilities for aggregate in road beds. Alternatively, the crushed glass can be used in sand blasting industry in the form of glass beads. Similarly, the aluminum end caps are captured for further handling. Suffice it to say, the aluminum end caps are collected and are likewise resold for their recycle value.

In a most preferred form of the invention, the housing wherein the mercury containing lamps are destroyed includes a tray which is slidably mounted on the housing for movement between loading and operational positions. In a loading position, the tray is positioned to facilitate loading of mercury containing lamps thereon, thus, reducing breakage of the fragile tubes. In an operational position, the tray is positioned within the housing to allow the lamps carried thereon to be destroyed.

The lamp destruction apparatus furthermore preferably includes a ram mounted for reciprocal movement within the housing of the lamp destruction apparatus. In a preferred form, the ram is hydraulically operated to effect controlled destruction of the mercury containing lamps within the housing. The ram is operated at a controlled rate to permit the negative air flow to the housing to effectively handle the emission of mercury vapors from the lamps being destroyed. Unlike other heretofore known devices which tend to chop the elongated lamps into pieces, the ram of the lamp destruction apparatus operates at a controlled rate to cause the lamps to explode as a result of the ram pressing thereagainst. As will be appreciated from an understanding of this aspect of the present invention, the mercury containing lamps are minimally treated during the lamp destruction process so as to create a minimum of dust and particulate matter.

In an alternative form of the present invention, the housing includes a first chamber wherein a vacuum is created and lamps are destroyed and a depending or downwardly extending plenum leading from the first chamber. Moreover, the vehicle on which the destruction apparatus is mounted includes two laterally spaced chambers or reservoirs disposed on opposite lateral sides of the housing preferably beneath a floor of the enclosure of the vehicle. Each chamber or reservoir on the underside of the vehicle has an increased capacity for harvesting the broken glass and end caps as nonhazardous materials and which result from the lamp destruction process. Moreover, each of the chambers or reservoirs are arranged in material receiving relation relative to the first chamber on the housing. A manually operated vane is disposed in the plenum for directing to which chamber or reservoir the non-hazardous materials are to pass thereby effecting a beneficial, weight distribution for the vehicle.

In one form of the lamp destruction mechanism, the filter apparatus includes a redundant mercury filter system. That is, in a preferred from of the invention, the filter apparatus includes a primary mercury filter and a secondary mercury filter operably arranged in series relative to each other. Accordingly, nothing from inside the enclosure on the vehicle will be discharged directly to the ambient air outside the enclosure without passing through the dual filter system of the present invention.

Each mercury filter of the redundant system preferably includes a replaceable activated carbon filter for entrapping mercury vapors at a very high level therewithin. The filter apparatus of the lamp destruction mechanism further includes a particulate filter for entrapping material or matter other than mercury therewithin. Such particulate filter is operably disposed between the outlet from the lamp destruction mechanism housing and the primary mercury filter for entrapping dust particles and phosphorous matter therein. In a preferred form, the filter apparatus of the lamp destruction mechanism furthermore includes a particulate filter disposed between an outlet from the air handling unit and the exterior of the enclosure to allow only filtered air to be exhausted from the enclosure of the vehicle.

A salient feature of the present invention relates to the provision of an apparatus for sensing vapor levels within the enclosure of the vehicle. The sensing apparatus preferably includes a sensor for detecting the level of mercury within the enclosure of the vehicle and an apparatus, arranged in operable combination with the sensor, for recording the level of mercury vapors within the enclosure of the vehicle. Preferably, the recording apparatus operates automatically thus yielding a record of the sensed value of mercury levels within the enclosure as a function of the operation of the lamp destruction apparatus. Moreover, when the sensor detects a level of mercury vapors within the enclosure beyond a predetermined value, the sensor, in a preferred form of the invention, is capable of producing a signal to alert the operator as the high level of mercury vapors within the enclosure of the vehicle. In a most preferred form, the sensor apparatus is operably disposed between the primary and secondary mercury filters of the redundant filter system.

The enclosure on the vehicle which surrounds the lamp destruction apparatus is preferably temperature controlled. That is, mercury has a tendency to change state depending upon on the temperature. At a temperature beneath 60° F., mercury assumes a solid state. At a temperature above 80° F., mercury assumes a liquid state. Between 60° F. and 80° F., mercury remains in vapor form. The compartment or enclosure on the vehicle in which the vacuum operated lamp destruction apparatus is mounted is maintained at a controlled temperature ranging between 60° F. and 80° F. Moreover, a generator is preferably mounted on the vehicle for supplying the necessary source of power for operating the various lamp destruction components mounted in the enclosure of the vehicle.

Another aspect of the present invention relates to a process for destroying mercury containing lamps. The process according to the present invention comprises the steps of transporting a lamp destruction apparatus on a mobile vehicle to a site whereat the mercury containing lamps are used and collected; destroying the mercury containing lamps within an enclosure on the vehicle; and monitoring the level of mercury within said enclosure.

The step of destroying the mercury containing lamps furthermore preferably involves the step of placing the mercury containing lamps in a housing carried by the vehicle wherein said lamps are crushed by a ram. Moreover, the step of destroying the mercury containing lamps preferably includes the step of collecting particulates of glass and metal after the lamps are crushed.

Preferably, the process for destroying mercury containing lamps furthermore includes the step of creating a reduced pressure or vacuum within the housing such that air is drawn into the housing during the lamp crushing process. Preferably, the reduced pressure or vacuum is sufficient to prevent escapement of gases from the housing during the lamp crushing or destroying process.

To reduce the likelihood of contamination, the lamp destruction process furthermore includes the step of drawing the mercury vapors created as a result of the lamp destruction process toward a filter apparatus. In one form, the filter system involves a dual filter including a primary and secondary mercury filters. The step of monitoring the mercury levels within said enclosure is preferably effected between the primary and secondary filters as well as continually monitoring the air within the enclosure. The process furthermore preferably includes recording the levels of mercury sensed within the enclosure. The recording step is accomplished as a function of the step of destroying mercury containing lamps and is preferably effected automatically.

The mercury containing lamp destruction apparatus carried or transported on the vehicle has two phases. First, the used mercury containing bulbs or lamps are destroyed in a vacuum chamber thereby inhibiting any potential emissions of mercury into the atmosphere. Second, three distinct and separate by-products are harvested for secondary uses.

With the present invention, destruction of the spent mercury containing lamps can be effected quickly and efficiently with minimum of dust being created. Because the lamps explode and the glass pieces are not thereafter ground into smaller pieces, phosphorous dust is maintained at a minimum and readily handled by the filter apparatus for the lamp destroying mechanism. Moreover, because the ends caps of the crushed lamps and other product produced during the crushing process are neither passed through a grinder nor are subject to a grinding operation, the possibility of creating other potentially hazardous emissions such as lead dust is substantially eliminated with the present invention.

Using a vacuum to draw the mercury vapors toward a common source facilitates collection of the mercury. Once collected in the filter, the mercury can be collected by a licensed recycler for recapturing and reuse in industry. Notably, no element or apparatus of the present invention resides or is located outside of the walled enclosure on the vehicle. The output from the primary mercury filter, through which the mercury vapors initially pass, is continuously monitored and recorded.

The present invention is intended to eliminate the costly handling and voluminous paperwork of heretofore known systems while providing an efficient and economical process for disposing of spent mercury containing lamps in an environmentally acceptable manner. The monitoring ability of the present invention protects against potential emission of mercury vapors from the lamp destruction apparatus. In effect, the present invention creates a transparency for the generation of spent lamps. The present invention creates marketable commodities which will not be landfilled and, thus, the potential of nonsudden environmental involvement does not exist. As will be appreciated, with the present invention, spent mercury containing and/or fluorescent lamps do not have be repackaged and hauled sometimes hundreds of miles to a central disposal facility. Instead, a spent lamp processing facility and the advantages offered thereby are brought to the site where the spent lamps are generated or stored and where the spent lamp processing apparatus can be put to best use.

As will be appreciated, not all generators of spent lamps create a sufficient volume of mercury containing lamps warranting destruction of all the lamps at the particular site whereat the mercury containing lamps are generated or currently stored. Accordingly, another aspect of the present invention involves handling the mercury containing lamps in an efficient and effective manner. More particularly, this aspect of the present invention contemplates a satellite vehicle capable of traveling to facilities whereat smaller volumes of mercury containing lamps are generated or stored. At such facilities or locations, the spent mercury containing lamps are loaded into the satellite vehicle and are then transported to another or second location whereat the spent mercury containing lamps are recycled in accordance with that described above. As will be appreciated, such a satellite vehicle may make several stops at generators whereat smaller volumes of spent mercury containing lamps are stored or generated prior to final recycling of the spent mercury containing lamps.

According to this aspect of the invention, the mobile vehicle includes a mobile frame on which an enclosure is mounted. The enclosure on the vehicle is sized to receive and hold a plurality of mercury containing lamps therein. The enclosure on the vehicle further includes a door movable between open and closed positions for separating an interior of the enclosure from ambient atmosphere on an exterior of the enclosure when the door is in its closed position and for permitting access to the interior of the enclosure when the door is in the open position. The vehicle further includes an apparatus for creating a reduced pressure within the enclosure when the door is in its closed position. Because such mercury containing lamps are extremely fragile, a filter is arranged in operable combination with the apparatus for recovering any and all mercury vapors which are created within the enclosure of the vehicle as a result of breakage of one or more of the mercury containing lamps during transport. The enclosure on the vehicle further includes a sealed port for permitting a sensor probe to be inserted through such port and into the interior of said enclosure to allow for monitoring for potential presence of mercury vapors within said enclosure.

In a most preferred from of the invention, the filter through which the mercury vapors pass includes a housing which contains a filter media having an affinity for mercury vapors. Moreover, the apparatus for creating a reduced pressure within the enclosure of the vehicle includes an air handling unit. An inlet to the air handling unit is operably connected downstream of the filter apparatus and has an outlet leading to the exterior of the enclosure on the vehicle. Preferably, a replaceable filter is disposed between the outlet from the air handling unit and the exterior of the enclosure on the vehicle. To better handle any and all mercury vapors created as a result of spent lamp breakage, the temperature within the enclosure of the vehicle is preferably maintained within a predetermined range of temperatures. Moreover, a generator is provided in combination with the mobile frame of the vehicle to power the various components associated with this aspect of the invention.

According to yet another aspect of this invention, there is disclosed a process for transporting mercury containing lamps between first and second locations. Regarding this aspect of the invention, such process comprising the steps of: providing a mobile vehicle having an enclosure capable of holding and storing a plurality of mercury containing lamps therewithin, the enclosure having a door movable between open and closed positions thereby permitting an interior of the vehicle's enclosure to be separated from ambient atmospheric conditions on an exterior of the enclosure as a function of the position of the door, the vehicle further including a filter apparatus for entrapping mercury vapors from gases passed therethrough; loading a plurality of mercury containing lamps within said enclosure at the first location; moving the vehicle between said first and second locations; causing air within said enclosure to be positively circulated through the filter apparatus such that mercury vapors, resulting from breakage of any one or more of the mercury containing lamps held or stored within said enclosure, are captured within and by the filter apparatus as the vehicle is transported between the first and second locations; and, waiting a predetermined period of time after the vehicle arrives at its second location before the door on the enclosure is moved to an open position such that mercury vapors, if any, within the enclosure on the vehicle are captured by the filter apparatus.

This process of handling lamps containing mercury preferably further includes the step of controlling temperature levels within the enclosure on the vehicle within a predetermined range of temperatures. According to this process, the predetermined period of time for waiting before the door is opened on the enclosure after the vehicle arrives at the second location is determined as a function of the size of the vehicle's enclosure. Moreover, according to this aspect of the invention, the process of handling lamps containing mercury further includes the step of creating a reduced pressure within the enclosure on the vehicle after said door is moved to a closed position to cause mercury vapors to become entrapped in a predetermined direction of air flow.

These and other objects, aims, and advantages of the present invention will become readily apparent from the following detailed description, drawings and appended claims.

DETAILED DESCRIPTION OF THE DRAWINGS

FIG. 8 is an elevational view of a filter apparatus forming part of the present invention;

FIG. 9 is a top plan view of the filter apparatus illustrated in FIG. 8;

FIG. 10 is an end view similar to FIG. 4 but showing an alternative form of the present invention;

DETAILED DESCRIPTION OF THE PRESENT INVENTION

Figure 1:
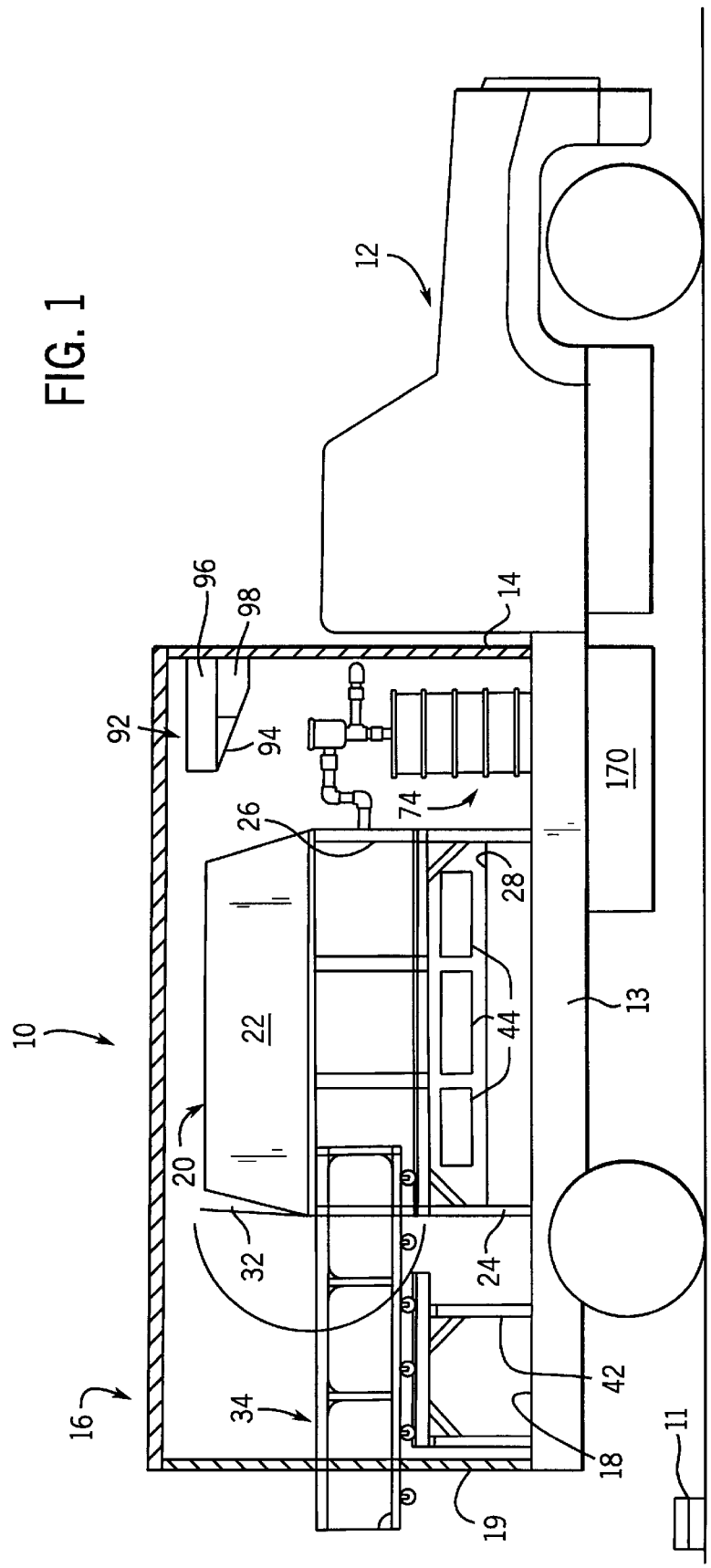
FIG. 1 is a side elevational view of one form of vehicle used in combination with the present invention with various parts shown in section to illustrate various details of the present invention.

While the present invention is susceptible of embodiment in multiple forms, there is shown in the drawings and will hereinafter be described preferred embodiments of the present invention with the understanding the present disclosure is to be considered as setting forth exemplifications of the invention which are not intended to limit the invention to the specific embodiments illustrated and described.

Figure 2:
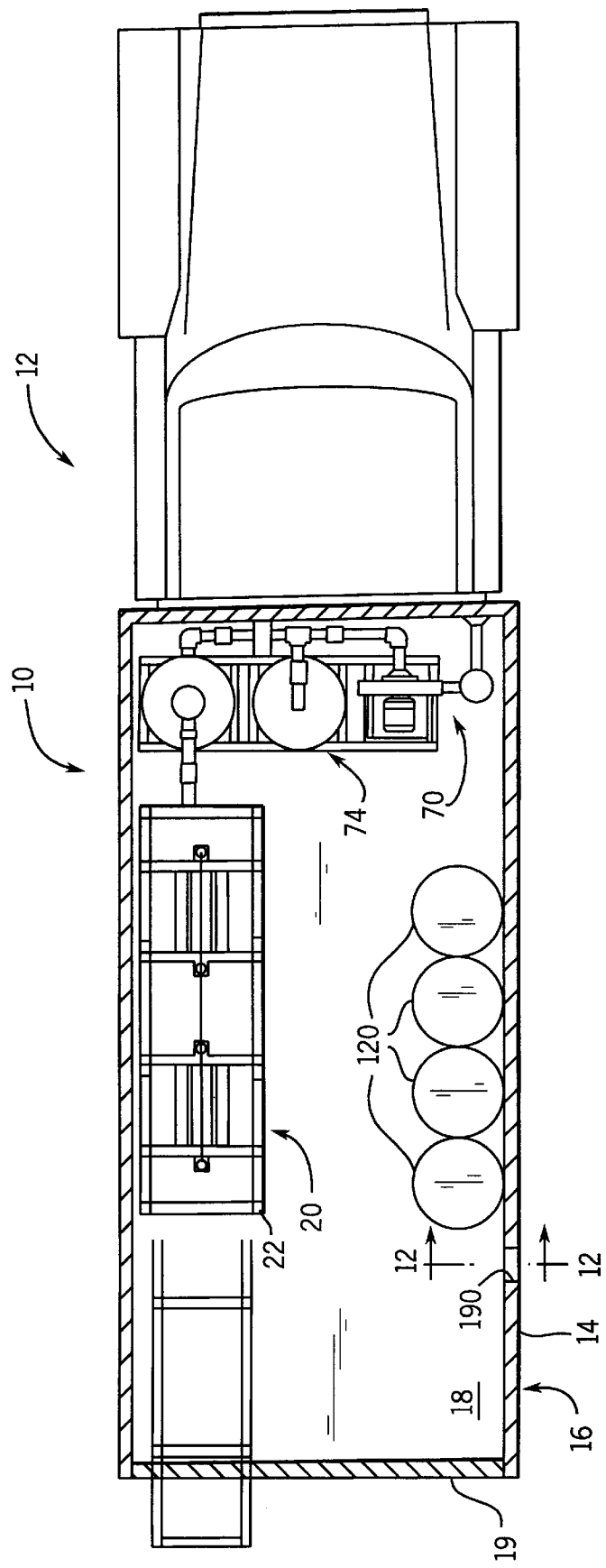
FIG. 2 is a top plan view of the vehicle illustrated in FIG. 1 with various parts shown in section to illustrate various details of the present invention.

Referring now to the drawings, wherein like reference numerals indicate like parts throughout the views, there is shown, in FIGS. 1 and 2, a mercury containing lamp destruction apparatus according to the present invention and which is generally indicated by reference numeral 10. The lamp destruction apparatus 10 is schematically shown as being mounted on a mobile vehicle 12. Accordingly, and as will be readily appreciated, the lamp destruction apparatus 10 of the present invention can be readily driven and positioned at the facility which generates used or spent mercury containing lamps such as fluorescent bulbs 11 (FIG. 1).

The vehicle 12 is schematically shown as being a self-propelled truck having a mobile frame 13 with a conventional truck body 14 including a walled enclosure 16 including a floor 18 mounted on the frame 13. As is conventional and well known in the art, access to the truck enclosure 16 is readily provided through a sliding or folding door 19. When the door 19 is closed, the enclosure 16 is substantially isolated from the outside ambient atmosphere.

Although illustrated in combination with a self-propelled truck 12, it will be readily appreciated that alternative mobile structures, i.e., trailers or railroad cars would equally suffice for transporting the lamp destruction apparatus of the present invention proximate to the site or facility which generates the spent mercury containing lamps which are or have been collected for disposal.

Figure 3:
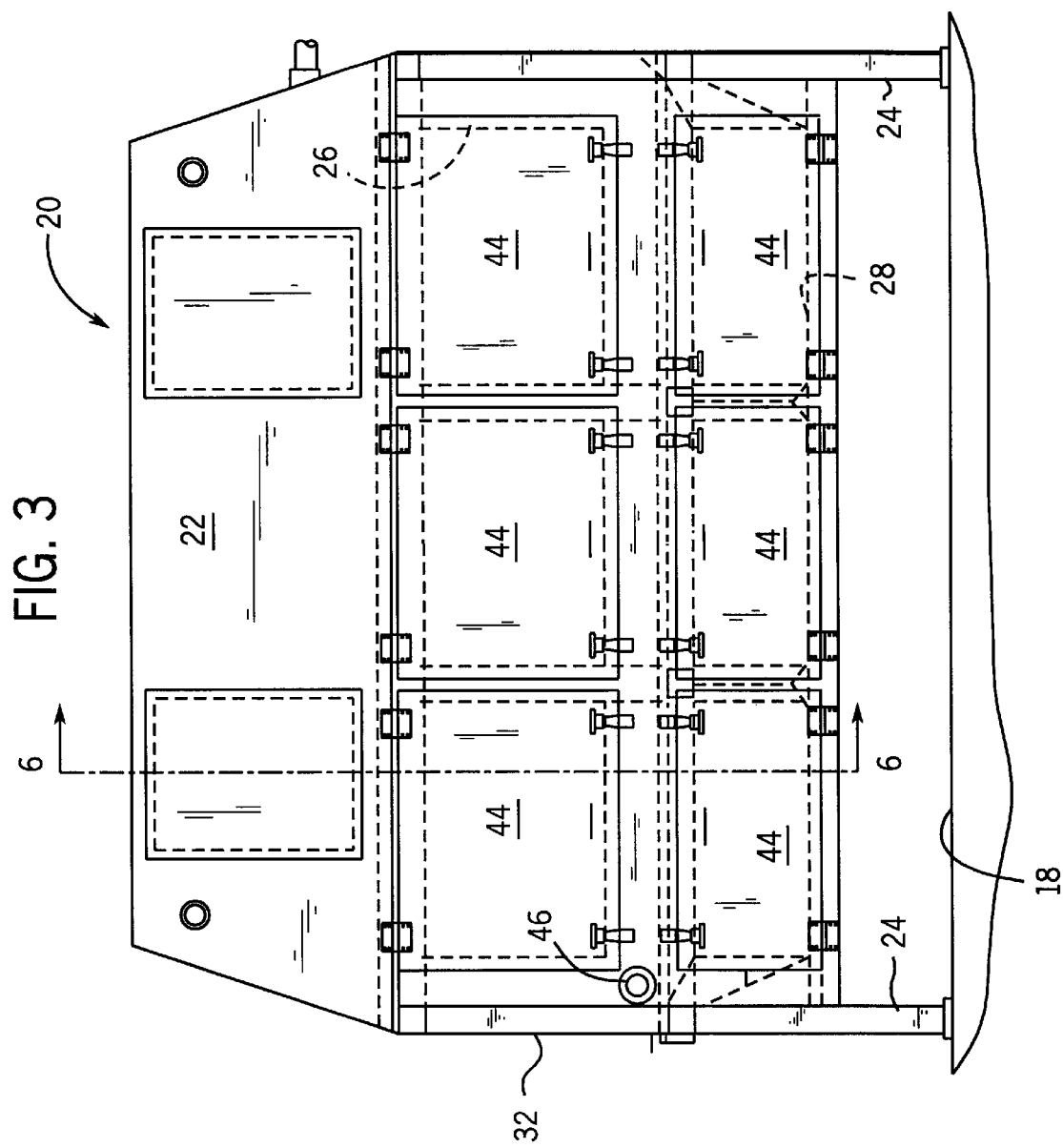
FIG. 3 is a front elevational view of a housing wherein mercury lamps are placed and destroyed.

As shown in FIGS. 1, 2 and 3, the lamp destruction apparatus 10 of the present invention includes an elongated housing 20 defined by a multiwalled enclosure 22 and sized to receive and hold multiple numbers of mercury containing lamps or fluorescent bulbs. The walls of the multiwalled enclosure 22 are fabricated from a gas and fluid impervious material such as steel or the like and are sealed at their adjoining ends. In the illustrated form of the invention, the multiwalled enclosure 22 is supported above the floor 18 of the enclosure 16 by a series of supports or legs 24. In a most preferred form of the invention, the housing 20 measures approximately 101 inches long, about 36 inches wide, and is about 41 inches high such that a large volume of mercury containing lamps can be destroyed simultaneously.

Figure 6:
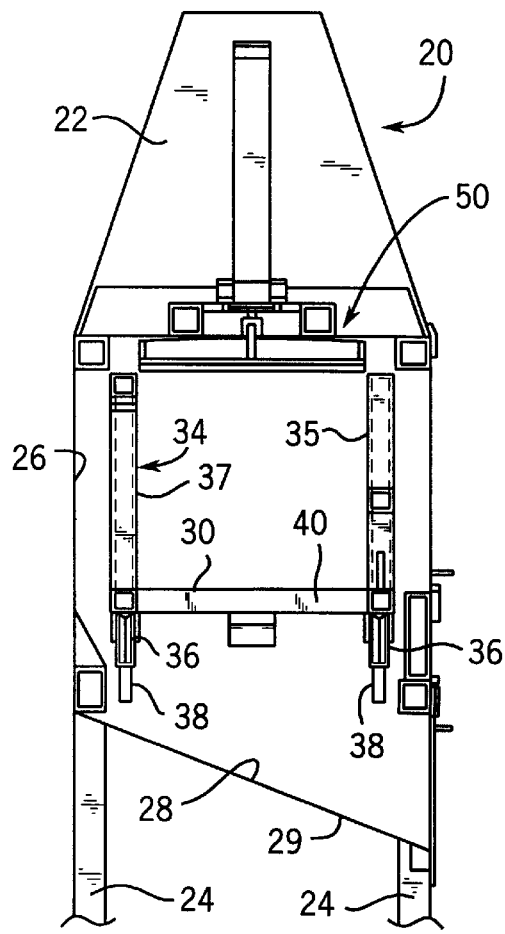
FIG. 6 is a sectional view taken along line 6—6 of FIG. 3.
Figure 5:
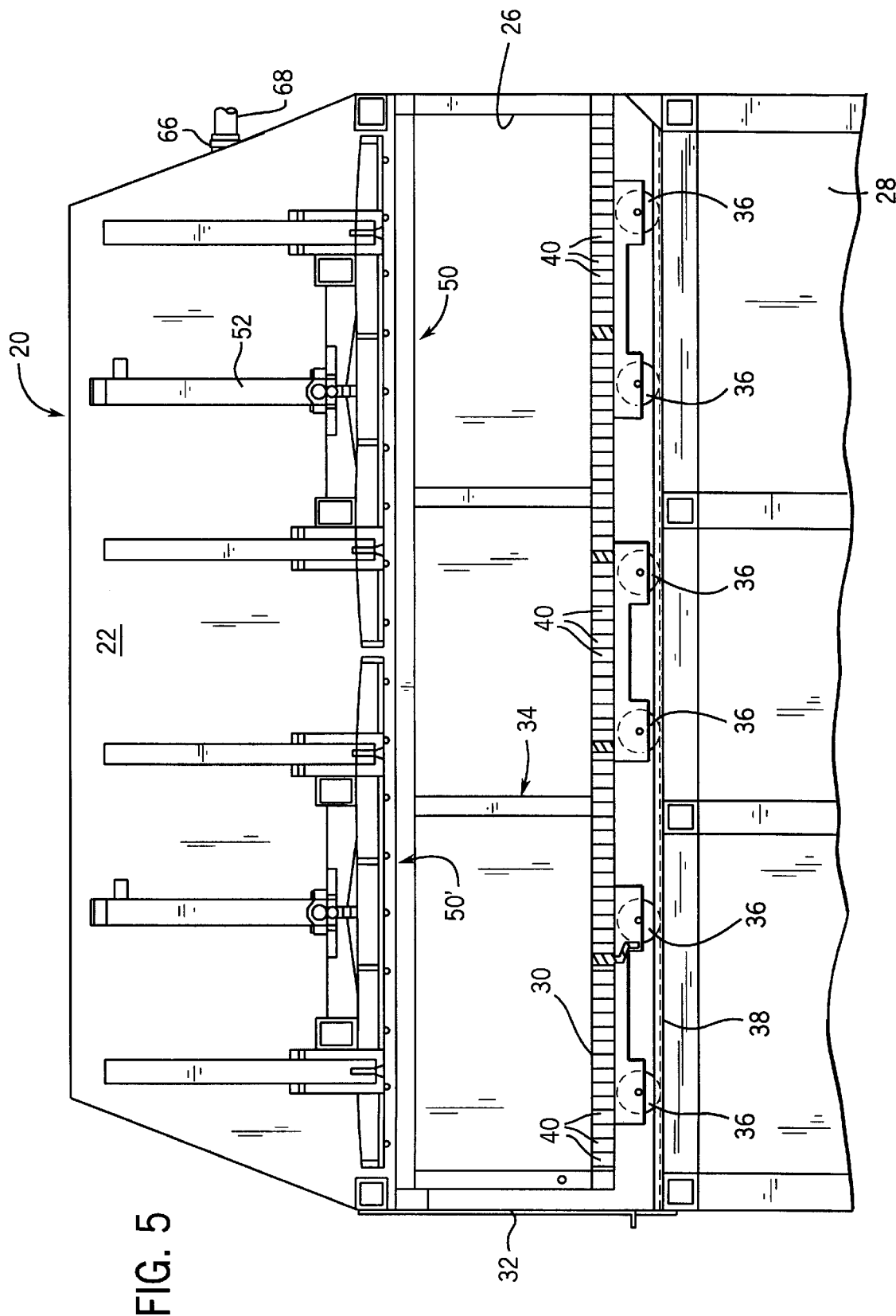
FIG. 5 is a sectional view taken along line 5—5 of FIG. 4.

As shown in FIGS. 1, 5 and 6, the elongated housing 20 defines a first or upper chamber 26 and one or more lower or second chambers 28. Notably, the second chambers 28 of housing 20 are arranged in material receiving relation relative to the first chamber 26. It is also important to note the glass receiving chamber 28 is sealed to the walled enclosure 22 and to the destruction chamber 26 to prevent gases or vapors from escaping to the surrounding atmospheric air.

Preferably, and as shown in FIGS. 5 and 6, housing 20 further includes a permeable floor 30 disposed between the first and second chambers 26 and 28, respectively. As such, broken glass and the metal ends resulting from a lamp destruction process are permitted to gravitationally fall through the floor 30 and into the receptacles or chambers 28 of housing 20. In the illustrated form of the invention illustrated in FIGS. 4 and 6, the bottom wall or panel 29 of each lower chamber 28 is downwardly slanted toward the front of the housing 20. As such, the glass and metal materials received therein will tend to slide forwardly toward the front of the housing 20 to promote their removal or extraction therefrom.

Figure 4:
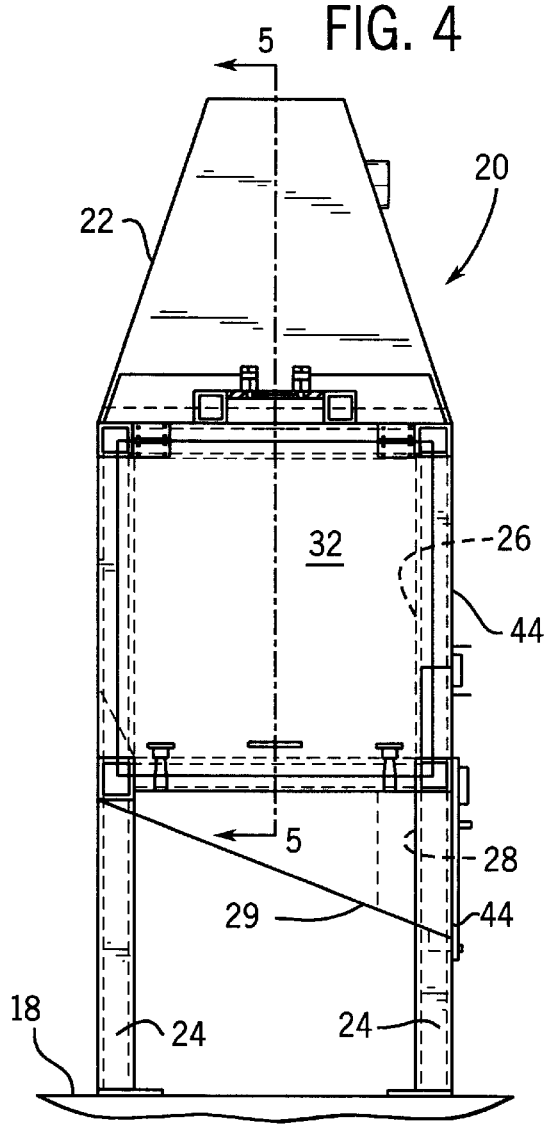
FIG. 4 is an end elevational view of the housing illustrated in FIG. 3.

In the illustrated form of the invention, and as shown in FIG. 4, housing 20 further includes a hinged door 32, preferably provided at one end of the walled enclosure 22, for permitting the elongated mercury containing bulbs or fluorescent lamps to be endwise loaded into chamber 26 and into position to be destroyed. As will be appreciated, suitable seals (not shown) can be disposed about the door 32 to enhance the sealing capability of the door 32 to the housing 20.

In a preferred form of the invention, and to enhance loading of the mercury containing lamps into mechanism 10 for destruction, housing 20 of mechanism 10 furthermore contains an elongated and rigid tray 34. The rigid tray 34 includes opposed sides 35 and 37 (FIG. 6) and is mounted on the housing 20 for sliding movement along a predetermined path of travel between a loading position, illustrated schematically in FIG. 1, and an operational position (FIG. 5). To promote its sliding movement, the tray 34 preferably includes a series of annularly grooved wheels 36 which ride on tracks 38 secured to the housing 20. Notably, tray 34 furthermore includes a series of spaced bars 40 extending between the opposed sides 35, 37 of the tray 34 to define the floor 30 and which serve to support the mercury containing lamps thereon. As shown in FIG. 1, an auxiliary support 42 is arranged relative to the housing 20 to support the tray 34 when moved relative to the housing 20 to an unloading position.

Returning to FIGS. 3 and 4, housing 20 of mechanism 10 furthermore includes a series of preferably hinged doors 44 for permitting access to the first and second chambers 26 and 28, respectively, of housing 20. As will, be appreciated from an understanding of the present invention, the doors 44 permit access to the lower or second chambers 28 thereby allowing glass particulates and metal ends, resulting from the lamp destruction process, to be harvested and withdrawn therefrom. The doors 44, arranged in combination with the lower or bottom chambers 28 of housing 20, are preferably disposed on a front side thereof.

In a preferred form of the invention, a conventional one-way air intake valve 46 (FIG. 3) is formed as part of the walled enclosure 22. As will be appreciated, valve 46 permits air to be drawn into the housing 20 from the ambient air surrounding the walled enclosure 22 and prevents air or vapors inside the housing 20 from passing to the outside of housing 20. Preferably, the air intake 46 for housing 20 is disposed toward a lower side of the housing 20.

As shown in FIGS. 5 and 6, the lamp destruction apparatus 10 of the present invention further includes a ram 50 arranged for reciprocal movement and at a controlled rate within the chamber 26 of housing 20. The ram 50 is preferably operated through a suitable form of driver 52 mounted to the walled housing 20. In the illustrated form of the invention, driver 52 is in the form of a hydraulically operated cylinder used to move the ram 50 at a controlled rate between retracted and extended positions. A suitable hydraulic pump (not shown) is provided in combination with the lamp destruction apparatus 10 for supplying the required fluid under pressure to operate the cylinder 52. Suffice it to say, the range of reciprocal movement of the piston or ram 50 within the housing 20 is sufficient to burst or break the mercury containing lamps loaded into the chamber 26 of housing 20 at a controlled rate. In a most preferred form of the invention, the ram 50 is mounted for generally vertical movement within the housing 20. Moreover, and in a most preferred form of the invention, a dual ram structure 50 and 50' is provided in combination with the housing 20 of the destruction apparatus 10 for destroying spent lamps containing mercury which are placed for destruction within the housing 20.

Figure 7:
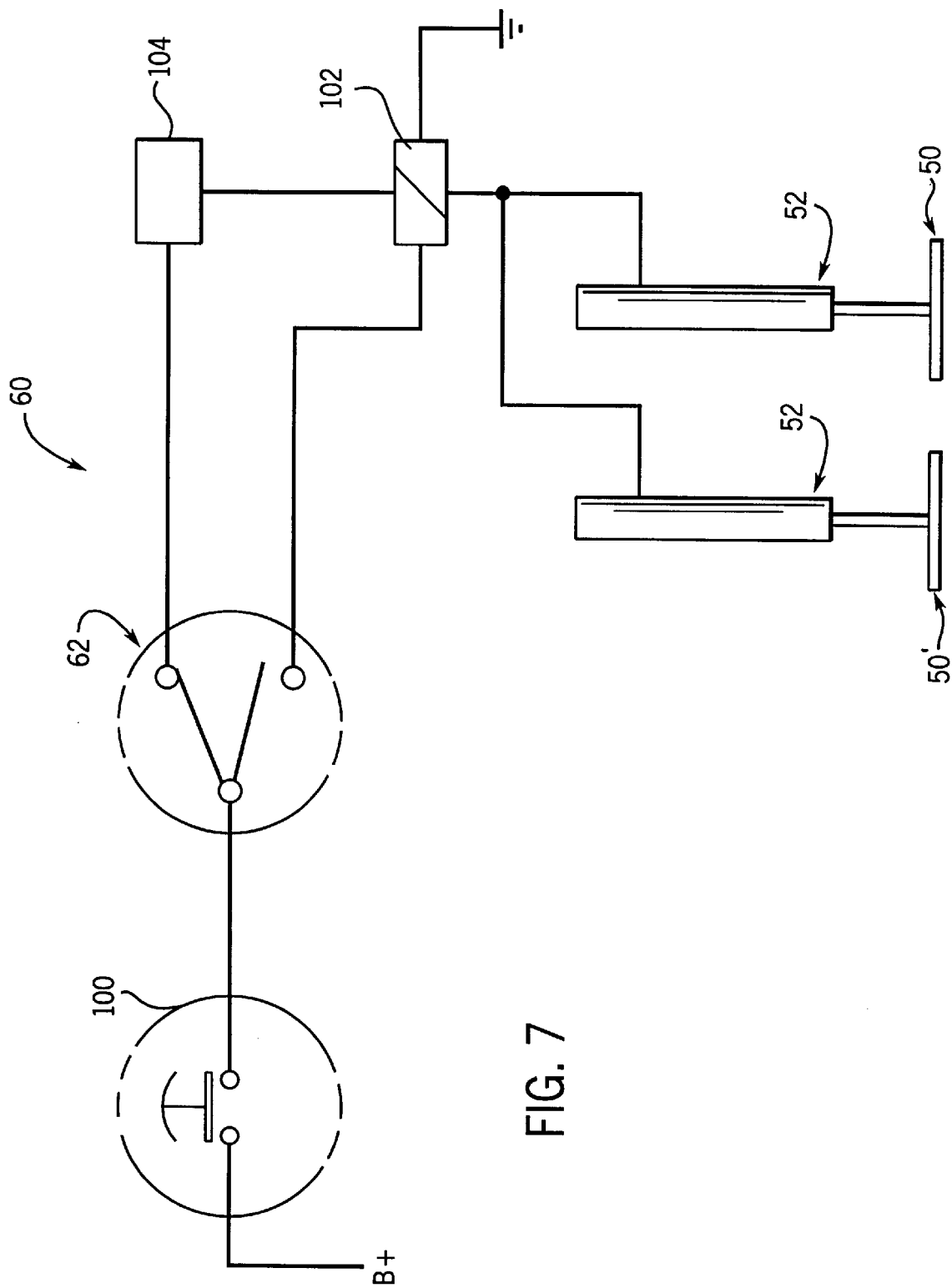
FIG. 7 is a schematic diagram of one form of control system for the present invention.

As shown in FIG. 7, a suitable control system 60 controls operation of the crushing apparatus 10. That is, during operation, the control system 60 controls and regulates movement of the drivers 52 and thereby the rams 50, 50' within the destruction chamber 26 of the walled housing 20. A suitable controller 62 is arranged in combination with each driver 52 for controlling the rate or speed of movement of the crushing rams 50, 50'. As the rams 50, 50' move to destroy the spent lamps, the spent lamps tend to explode within the destruction chamber 26 of housing 20. Since the lamps tend to explode within the housing 20, the amount of phosphorous dust created during the lamp destruction process is minimized as compared to other lamp destruction processes which crush the broken glass pieces between rollers or pass them along auger-like conveyors.

To control the mercury vapors created as a result of the lamp destruction process, a salient feature of the present invention involves using a negative pressure or vacuum rather than blowing the mercury vapors through the system. Research has revealed that even a slight vacuum will tend to draw anything airborne toward the source of negative air. Accordingly, the negative pressure or vacuum created in the destruction chamber 26 of housing 20 does not have to be significantly less than that of the surrounding atmospheric conditions. In the illustrated form of the invention, a negative pressure in the range of about 70 psi. within the vacuum chamber 26 appears to work well to draw vapors from the housing 20.

As schematically illustrated in FIGS. 8 and 9, an outlet port 66 is defined by the walled enclosure 22 of housing 20 and through which mercury vapors from destruction chamber 26 are withdrawn from the housing 20. As may ne noted from FIG. 5, in the illustrated form of the invention, the outlet port 66 is disposed in elevated relation relative to the inlet port 46 (FIG. 3) such that an advantageous directional air flow is created within the destruction chamber 26 of housing 20. A conduit or vacuum tube 68 is connected and sealed to the outlet 66 and to a source of vacuum pressure such as a suitable air handling unit 70. In the illustrated form of the invention, the air handling unit 70 includes a fan 72 preferably mounted within the enclosure 16. An inlet 71 to the fan 72 is connected to an exhaust end 73 of a filter apparatus 74. An exhaust end 75 of the fan 72 directs air to the exterior of the enclosure 16.

As shown in FIGS. 8 and 9, intermediate the housing 20 and the air handling unit 70, gases passing from the destruction chamber 26 of housing 20 are directed through a filter apparatus 74. The purpose of the filter apparatus 74 is to trap and filter mercury vapors passing therethrough such that air free of any mercury vapors is presented at the outlet end 73 of filter apparatus 74 and presented to the air handling unit 70 to be exhausted from the enclosure 16.

The filter apparatus 74 is a conventional activated carbon filter capable of absorbing toxic mercury vapors. The filter apparatus 74 preferably includes a primary mercury filter 76 and a secondary mercury filter 78 which are substantially identical to each other. Suffice it to say, each filter 76, 78 preferably includes a housing 77 made from a nonpermeable material, such as steel or the like, and which contains a suitable filter media having an affinity for mercury passing thereover.

In a most preferred form of the invention, the primary mercury filter 76 and secondary mercury filter 78 are operably arranged in series relative to each other. Moreover, and in a preferred form of the invention, the inlet 79 to each filter 76, 78 is disposed toward an upper end of the respective filter housing while the exhaust or outlet end 79' of each filter 76, 78 is disposed toward a bottom of the respective filter housing to accomplish an advantageous flow of gases through the filter. An activated carbon filter of the type sold by CETCO Industrial Services of Arlington Heights, Ill. is one example of a filter apparatus that would work well with the present invention.

In a preferred form of the invention, and as shown in FIGS. 8 and 9, an additional filter 80 is disposed between the outlet 66 of the vacuum chamber 26 of housing 20 and the filter apparatus 74 for withdrawing matter, i.e. dust particles, other than mercury from the gases passing therebetween. For example, filter 80 is capable of withdrawing phosphorous dust from the gases passing between the outlet 66 of housing 20 and the primary mercury filter 76. Filter 80 preferably includes any conventional high efficiency particulate absorber.

As shown in FIGS. 8 and 9, a most preferred form of filter apparatus 74 further includes a further filter 82 disposed between the outlet 75 of the air handling unit 70 and the exterior of the enclosure 16. As will be appreciated, the purpose of filter 82 of filter apparatus 74 is to withdraw matter, i.e. dust particles, other than mercury from the gases passing from the secondary mercury filter 78. For example, filter 82 is capable of withdrawing phosphorous dust from the gases passing between the outlet 75 of the air handling unit 70 and the exterior of enclosure 16. Filter 82 preferably includes any conventional high efficiency particulate absorber.

A salient feature of the present invention relates to the provision of a sensor apparatus 84. The senor apparatus 84 serves a dual function. First, in a preferred form of the invention, the sensor apparatus 84 continually senses the level of mercury vapors within the enclosure 16. Second, and in accordance with a preferred form of the invention, the sensor apparatus 84 serves to continually monitor the mercury vapor levels passing through the gases exhausted from the primary mercury filter 76. In this regard, and those embodiments of the invention utilizing a redundant mercury filter system, the sensor apparatus 84 is disposed between the primary mercury filter 76 and the secondary mercury filter 78. The sensor apparatus 84 includes a sensor 86 having a range of detection from 0.001 to 0.999 mg/m3 Hg. Suffice it to say, sensor 86 of apparatus 84 is stable and selective to mercury, eliminating interferences common to ultraviolet analyzers, such as water vapor and hydrocarbons. The sensor 86 is connected to software which programs a data logger 88. The software used in connection with the present invention is of the type sold by Arizona Instrument under Jerome Communications Software Part Number SS-103. The data logger initiates automatic sampling of the output from the filter apparatus 74, and triggers alarms to alert the operator in the event mercury levels beyond a predetermined limit is detected by the sensor 86. The sensor 86 is of the type sold by Arizona Instrument under Model Jerome 431-X Mercury Vapor Analyzer.

A recorder 90 is furthermore provided in combination with the sensor apparatus 84 for automatically and continually recording and maintaining an ongoing record of the level of mercury within the enclosure 16. Accordingly, the levels of mercury vapors within the enclosure 16 and the mercury levels detected at the output of the primary mercury filter 76 are recorded during the lamp destruction operation. As such, performance of the destruction apparatus 10 at any particular time of any particular date can be reviewed if and when necessary for compliance with federal and state regulations. In a most preferred form of the invention, a manual log is also maintained relating to performance of the mercury containing lamp destruction apparatus 10.

As illustrated in FIG. 1, and because mercury is such a volatile or changing element, the enclosure 16 in which the destruction apparatus 10 of the present invention is mounted includes an air conditioning assembly 92. The air conditioning assembly 92 is configured to maintain the ambient air temperature inside the enclosure 16 on the vehicle 12 within a predetermined temperature range. That is, the air conditioning apparatus 92 is configured to maintain the temperature within the enclosure 16 between 60° F. and 80° F. In a most preferred embodiment of the invention, the air conditioning apparatus 92 serves to maintain the temperature in the enclosure at 70° F. A thermostat 94 (FIG. 1) is arranged in the enclosure 16 for monitoring the ambient temperature in the enclosure 16 of the vehicle 12.

During operation of the destruction apparatus 10, if the temperature within the enclosure is outside the acceptable range, the thermostat 94 signals the air conditioning unit 92 to operate until the ambient temperature within the enclosure 16 is within a predetermined range. As will be appreciated by those skilled in the art, the thermostat 94 is connected to and automatically operates the air conditioning unit 92. In the preferred form of the invention, and to maintain the appropriate range of temperatures within the enclosure 16, the air conditioning apparatus 92 includes a heating unit 96 and a cooling unit 98.

As mentioned above, a schematic representation of the electrohydraulic control system 60 is illustrated in FIG. 7. As shown, the control system 60 includes a manually operated master switch 100 which is connected to a suitable power source B+such as the battery on the vehicle. The master switch 100 is preferably arranged at a convenient location relative to the destruction apparatus 10 to enable operation thereof. As will be appreciated, manual actuation of the master switch 100 enables the control system 60 thereby allowing the destruction apparatus 10 of the present invention to operate.

As shown in FIG. 7, the master switch 100 is connected to the conventional and well known controller 62. The purpose of the controller 62 is to operate the various components of the destruction apparatus 10 in either a service mode of operation or an operational mode of operation. The service mode of operation allows various components of the destruction apparatus 10 to be operated in a manner conducive to servicing of the components of the destruction apparatus 10. Suffice it to say, the operational mode of operation of the destruction apparatus 10 involves the normal bulb crushing operation for which the destruction apparatus was designed to operate. As shown, the controller 62 of the control system 60 is connected to a conventional control relay 102 used to control the driver or hydraulic cylinder 52 used to move the ram 50 in a manner destroying the mercury containing bulbs or lamps within the destruction apparatus 10. As is known in the art, the control relay 102 controls the flow of pressurized hydraulic fluid to the driver 52 used to operate the ram 50. In the illustrated form of the invention, the driver 52 operates under a spring return such that when it reaches its extended position the fluid flow to the cylinder 52 is cut off and the spring operates to return the ram 50 to its retracted position. In the illustrated form of the invention, a manually adjustable controller 104 is preferably provided to adjust operation of the relay 102 such that the rate of movement of the ram 50, during the operational mode of operation of the destruction apparatus, can be selected depending upon the operating conditions of the destruction apparatus 10. That is, the volume of mercury vapor being exhausted through port 66 of the destruction apparatus 10 can be regulated by adjusting the rate at which the ram 50 proceeds to crush the spent fluorescent lamps in the destruction chamber 26 of housing 20.

In this illustrated form of the invention, housing 20 of the lamp destruction apparatus 10 is disposed toward one side of and extends generally longitudinally within the enclosure 16. As shown in FIG. 2, a plurality of containers 120 are preferably disposed along an opposite side of the enclosure 16. The purpose of the containers 120 is to permit glass particulates withdrawn from the chambers 28 of housing 20 therewithin for storage. Alternatively, some of the containers 120 are used to store the metal ends resulting from the destroyed lamps.

Returning to FIG. 1, the lamp destruction apparatus of the present invention further includes a generator 170 carried on the vehicle 12 for providing the power necessary to operate the various components of the lamp destruction system 10. The generator 170 is of any suitable type and is preferably self propelled.

An alternative form of mercury containing lamp destruction apparatus embodying features of the present invention is schematically illustrated in FIG. 10. This alternative form of mercury containing lamp destruction apparatus is designated generally by reference numeral 210. The elements of this lamp destruction apparatus that are identical or functionally analogous to those components discussed above regarding destruction apparatus 10 are designated by reference numerals identical to those used above with the exception that this embodiment uses reference numerals in the 200 series.

The destruction apparatus 210 includes a housing 220 mounted within a multiwalled enclosure 216 on a vehicle 212. The enclosure 216 is provided with a door 219 for permitting access to an interior of enclosure 216. Housing 220 has an elongated configuration for accommodating and lengthwise holding a series of mercury containing lamps or fluorescent bulbs. The multiwalled enclosure or housing 220 is supported above the floor 218 of the enclosure 216 by a series of legs 224. In this form of the invention, the housing 220 is generally centrally located and extends along the longitudinal centerline of the enclosure 216. In this illustrated form of the invention, vehicle 212 is provided with raised or elevated flooring 218' arranged in vertically spaced relation relative to floor 218.

As shown, the elongated housing 220 defined an upper chamber 226 wherein a reduced pressure or vacuum is created in the manner described in detail above. The vehicle 212 further defines a pair of enlarged second chambers or reservoirs 228 and 228' disposed on opposite lateral sides of the housing 220. Because of their disposition relative to the vehicle, the reservoirs 228, 228' can be enlarged to enhance the carrying capacity of each reservoir 228, 228' as compared to the chambers 28 of the first embodiment of this invention. Each chamber 228, 228' furthermore includes a door 245 for promoting access to the interior and for allowing broken glass and metal ends to be readily removed therefrom.

As in the first embodiment of the lamp destruction apparatus, both the chambers or reservoirs 228, 228' are arranged in material receiving relation relative to the first chamber 226 of housing 220. As shown in FIG. 10, in this embodiment of the invention, housing 220 defines a downwardly extending or depending plenum 240 leading from chamber 226. A divider 242 is generally centrally arranged within the plenum 240 beneath the destruction chamber 226 defined by housing 220 for directing particulate glass and metal ends resulting from the destruction of mercury containing lamps within the destruction chamber to either of the reservoirs or chambers 228, 228'.

As shown, the divider 242 defines downwardly slanting side surfaces 244, 246 which are joined to each other at an upper end thereof. Moreover, a manually operated vane 250 is disposed in the plenum chamber 240 between the destruction chamber 226 and the divider 242. The vane 250 is movable about a generally horizontal axis 252 extending generally parallel with the floor 218 to allow the vane 250 to be manually shifted to either of the dotted line positions shown in FIG. 10 or any suitable position therebetween.

Figure 11:
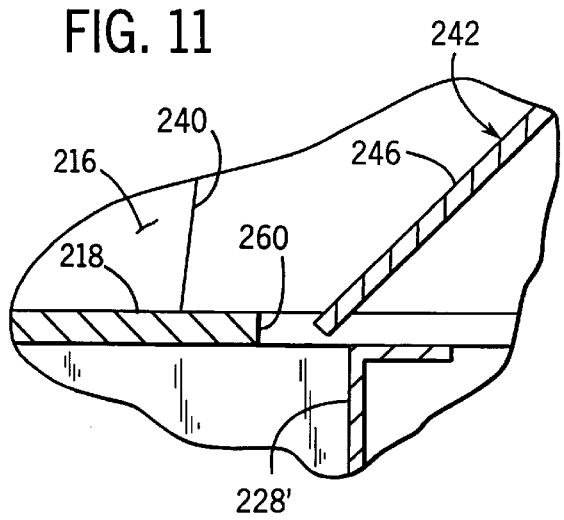
FIG. 11 is an enlarged sectional view of that portion encircled in FIG. 10.

Turning to the enlarged schematic showing in FIG. 11, the floor 218 of the enclosure 216 is provided with openings 260 (with only one opening being shown) at the lower end of each side surface 244, 246 of the divider 242. The openings 260 permit communication between the depending plenum 240 and the reservoirs 228, 228' on the vehicle 210. As will be appreciated, the openings 260 are sized to allow particulates of glass and the metal ends of the destroyed lamps to pass through the floor 218 of the enclosure 216 and into selected reservoir 228, 228'. The vane 250 advantageously allows a generally even distribution of materials to the reservoirs 228, 228'. That is, during one recycling process, the vane 250 may be disposed to one angular disposition thereby permitting the broken glass and metal ends from the mercury containing lamps destroyed in housing 220 to pass into reservoir 228. During the next recycling process, the vane 250 can be readily shifted such that the broken glass and metal ends resulting from the destruction of mercury containing lamps during this particular destruction process are directed to reservoir 228'. Thus, a more uniform load distribution can be advantageously effected on the vehicle 212.

Another aspect of the present invention involves a process for destroying mercury containing lamps. The process according to the present invention comprises the steps of: transporting a lamp destruction apparatus on a mobile vehicle to a site whereat the mercury containing lamps are used and collected; destroying the mercury containing lamps within an enclosure on the vehicle; and monitoring the level of mercury within said enclosure.

The step of destroying the mercury containing lamps furthermore preferably involves the step of placing the mercury containing lamps in a housing carried by the vehicle wherein said lamps are crushed by a ram. Moreover, the step of destroying the mercury containing lamps preferably includes the step of collecting particulates of glass and metal after the lamps are crushed.

Preferably, the process for destroying mercury containing lamps furthermore includes the step of creating a reduced pressure or vacuum within the housing such that air is drawn into the housing during the lamp crushing process. Preferably, the reduced pressure or vacuum is sufficient to prevent escapement of gases from the housing during the lamp crushing or destroying process.

To reduce the likelihood of contamination, the lamp destruction process furthermore includes the step of drawing the mercury vapors created as a result of the lamp destruction process toward a filter apparatus. Preferably, the filter system involves a dual filter having primary and secondary mercury filters. The step of monitoring the mercury levels within said enclosure is preferably effected between the primary and secondary filters as well as continually monitoring the air within the enclosure. The process furthermore preferably includes recording the levels of mercury sensed within the enclosure. The recording step is accomplished as a function of the step of destroying mercury containing lamps and is preferably effected automatically.

According to one aspect of the invention, the mercury containing lamp destruction apparatus of the present invention has two objects. First, the used mercury containing bulbs or lamps are handled in a vacuum chamber thereby inhibiting any potential emissions of mercury into the atmosphere. Second, according to this aspect of the invention, three distinct and separate byproducts are harvested and recycled for secondary uses.

As will be appreciated, and as mentioned above, not all generators of spent lamps create a sufficient volume of mercury containing lamps warranting destruction of all the lamps at the particular site whereat the mercury containing lamps are generated or currently stored. Accordingly, another aspect of the present invention involves handling or transporting of the mercury containing lamps in an efficient and effective manner from a first location, whereat a smaller number or volume of spent lamps containing mercury are stored or generated, to a second location, whereat the lamps can be recycled in the manner discussed above. More particularly, this aspect of the present invention contemplates a satellite vehicle capable of traveling to facilities whereat smaller volumes of mercury containing lamps are generated or stored. At such facilities or locations, the spent mercury containing lamps are loaded into the satellite vehicle and are then transported to another or second location whereat the spent mercury containing lamps are recycled in accordance with that described above. As will be appreciated, such a satellite vehicle may make several stops at generators whereat smaller volumes of spent mercury containing lamps are stored or generated prior to final recycling of the spent mercury containing lamps.

According to this aspect of the invention, the satellite mobile vehicle is similar to that discussed above. Suffice it to say, the satellite vehicle includes the mobile frame 13 on which the enclosure 16 is mounted. As discussed above, and in accordance with this aspect of the invention, the enclosure 16 on the vehicle is sized to receive and hold a plurality of mercury containing lamps therein. In the same manner discussed above, the enclosure 16 on the satellite vehicle further includes a door 19 movable between open and closed positions for separating an interior of the enclosure from ambient atmosphere on an exterior of the enclosure 16 when the door 19 is in its closed position and for permitting access to the interior of the enclosure 16 when the door 19 is in the open position. As discussed above, and in accordance with this aspect of the invention, the satellite vehicle further includes an apparatus 70 for creating a reduced pressure within the enclosure 16 when the door 19 is in its closed position. Because mercury containing lamps are extremely fragile, a filter 74 is arranged in operable combination with the apparatus 70 for recovering any and all mercury vapors which are created within the enclosure 16 of the vehicle as a result of breakage of one or more of the mercury containing lamps during transport.

Figure 12:
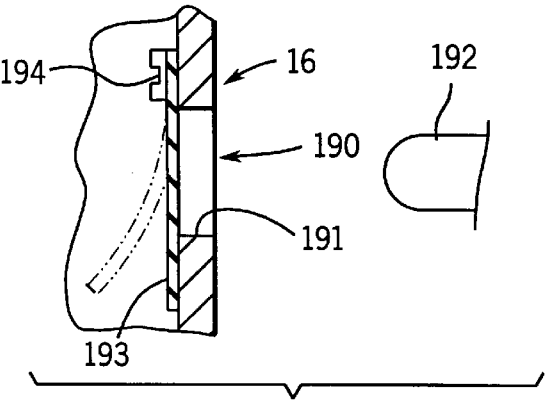
FIG. 12 is a sectional view taken along line 12—12 of FIG. 2.
Figure 13:
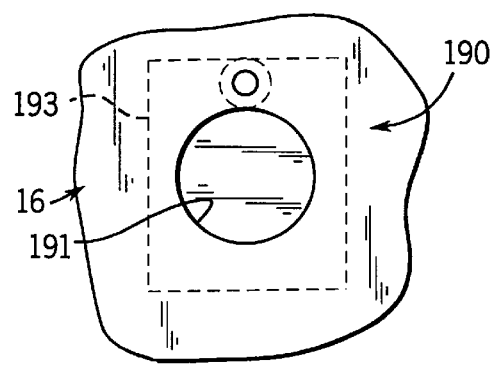
FIG. 13 is a side elevational view of one form of sealed port illustrated in FIG. 12.

As shown in FIG. 2, the enclosure 16 on the satellite vehicle further includes a sealed port 190. As shown in FIGS. 12 and 13, the sealed port 190 includes an opening 191 in one of the walls of the enclosure 16. The opening 191 is sized to permit a sensor probe 192 to be inserted through such opening 191 and into the interior of said enclosure 16 to allow monitoring for potential presence of mercury vapors within said enclosure 16. In the illustrated form of the invention, a closure member 193 on the interior of the enclosure 16 extends across and entirely covers the port 191 and acts as a reed valve to seal closed the opening 191 thereby inhibiting mercury vapors from escaping from the enclosure of the satellite vehicle as through the opening 191. As will be appreciated, the closure member 193 is formed from any suitable material which will inhibit passage of mercury vapors therethrough. In the illustrated from of the invention, a fastener 194 secures the closure member 193 relative to the opening 191while readily allowing the sensor probe 192 to be inserted into the enclosure 16 through the opening 191.

Figure 14:
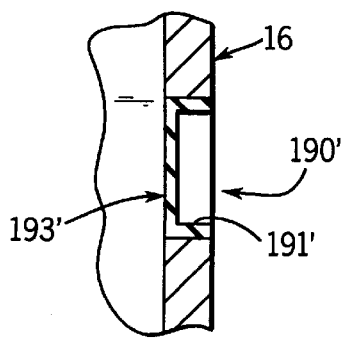
FIG. 14 is a sectional view similar to FIG. 12 illustrating an alternative form of sealed port.
Figure 15:
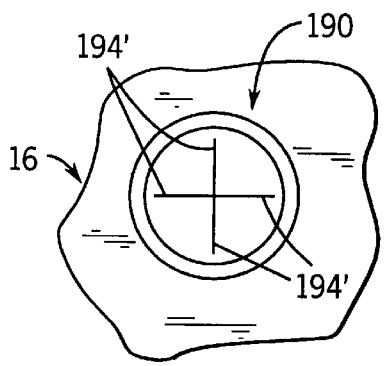
FIG. 15 is similar to FIG. 13 but illustrates a side elevational view of that embodiment of the sealed port shown in FIG. 14.

An alternative embodiment of a sealed port is illustrated in FIGS. 14 and 15 and is generally indicated by reference numeral 190'. Like that discussed above, the enclosure 16 of the satellite vehicle is provided with an opening 191' in one of the walls of the multiwalled enclosure 16 of the satellite vehicle. A seal 193', formed from a resilient material impervious to mercury vapors passing therethrough, is inserted into and is in a sealed relationship with the opening 191'. As shown in FIG. 15, the seal 193' includes a plurality of slits 194' radially extending from the center of the seal 193' outwardly toward the peripheral edge thereof As the sensor probe 192 pushes through the seal 193', the flaps of the seal 193' surround the sensor probe 192 and prevent mercury vapors from escaping outwardly through the opening 191'.

In the same manner as discussed with respect to vehicle 10, the satellite vehicle will include a air handling unit 70 preferably in the form of fan 72 for creating a reduced pressure within the enclosure 16. Additionally, a filtering device, similar to that described above by reference numeral 82, will be operably disposed across the outlet end of the air handling unit for the satellite vehicle to filter air passing to the exterior of the enclosure 16 of the satellite vehicle from the air handling unit 70. Moreover, the satellite vehicle will include an air conditioning unit like that generally referenced above by reference numeral 92 for controlling and maintaining the temperatures within the enclosures of the satellite vehicle within a predetermined range. Preferably, the range of temperatures to be maintained within the enclosure 16 of the satellite vehicle approximate between 60° F. and about 80° F. Moreover, the satellite vehicle will include a generator like that identified above by reference numeral 170 for generating sufficient power within the enclosure 16 during operation of the satellite vehicle.

As will be appreciated from the above, the satellite vehicle is preferably substantially similar to that described above with the exception there is no destruction apparatus is arranged within the enclosure. The satellite vehicle will, however, include a filter apparatus similar to that described above by reference numeral 74. Suffice it to say, the filter apparatus 74 for the satellite vehicle will include a mercury filter having a housing 75 which holds filter media having an affinity to mercury vapors drawn therepast or moving thereover. Notably, the inlet to the air handling unit 70 is operably connected to the filter apparatus 74 to establish a predetermined flow of gases through the filter apparatus 74. The inlet to the filter apparatus 74 opens to the enclosure 16.

According to still another aspect of the present invention there is provided a process for transporting mercury containing lamps between first and second locations. Regarding this aspect of the invention, such process comprising the steps of: providing a mobile vehicle having an enclosure capable of holding and storing a plurality of mercury containing lamps therewithin, the enclosure having a door movable between open and closed positions thereby permitting an interior of the vehicle's enclosure to be separated from ambient atmospheric conditions on an exterior of the enclosure as a function of the position of the door, the vehicle further including a filter apparatus for entrapping mercury vapors from gases passed therethrough; loading a plurality of mercury containing lamps within said enclosure at the first location; moving the vehicle between said first and second locations; causing air within said enclosure to be positively circulated through the filter apparatus such that mercury vapors, resulting from breakage of any one or more of the mercury containing lamps held or stored within said enclosure, are captured within and by the filter apparatus as the vehicle is transported between the first and second locations; and, waiting a predetermined period of time after the vehicle arrives at its second location before the door on the enclosure is moved to an open position such that mercury vapors, if any, within the enclosure on the vehicle are captured by the filter apparatus.

This process of handling lamps containing mercury preferably further includes the step of controlling temperature levels within the enclosure on the vehicle within a predetermined range of temperatures. According to this process, the predetermined period of time for waiting before the door is opened on the enclosure after the vehicle arrives at the second location is determined as a function of the size of the vehicle's enclosure. Moreover, according to this aspect of the invention, the process of handling lamps containing mercury further includes the step of creating a reduced pressure within the enclosure on the vehicle after said door is moved to a closed position to cause mercury vapors to become entrapped in a predetermined direction of air flow.

From the foregoing it will be observed that numerous modifications and variations can be effected without departing or detracting from the true spirit and scope of the novel concept of the present invention. It will be appreciated that the present disclosure is intended to set forth exemplifications of the invention which are not intended to limit the invention to the specific embodiments illustrated. The disclosure is intended to cover by the appended claims all such modifications as fall within the spirit and scope of the claims.

What is claimed is:

1. A process for handling spent mercury containing lamps to create non-toxic recyclable materials comprising the steps of:
    transporting a lamp destruction apparatus on a vehicle to a site whereat the mercury containing lamps are collected;
    crushing the mercury containing lamps within a closed compartment in an enclosure on the vehicle;
    withdrawing mercury vapors, created when the mercury containing a lamps are crushed, from the closed compartment and directing the mercury vapors through a filter apparatus having an inlet connected to said closed compartment and an outlet, said filter apparatus creating a non-toxic recyclable material from the mercury vapors drawn into the inlet from said closed chamber with clean air being exhausted from said outlet of said filter apparatus; and
    continuously monitoring and measuring the level of mercury vapors within the enclosure as the mercury containing lamps are crushed.

2. The spent lamp handling process according to claim 1 further including the step of positioning said lamps in said closed compartment for crushing by a ram wherein said closed compartment is defined by a sealed housing carried by the vehicle.

3. The spent lamp handling process according to claim 2 further including the step of collecting non-toxic particulates of glass and metal after the lamps are crushed.

4. The process for handling spent mercury containing lamps according to claim 3 wherein the step of collecting particulates of glass and metal further involves the step of directing said particulates to either of two collection bins carried on said mobile vehicle.

5. The spent lamp handling process according to claim 2 further including the step of drawing ambient air into said housing during crushing of said lamps through creation of a reduced pressure within said housing.

6. The spent lamp handling process according to claim 2 further including the step of drawing mercury vapors from said housing toward a filter apparatus during the lamp crushing process.

7. The spent lamp handling process according to claim 6 wherein said filter apparatus includes a primary mercury filter and a secondary mercury filter.

8. The spent lamp handling process according to claim 7 wherein the step of monitoring levels of mercury within said enclosure is operatively effected between said primary and secondary filters.

9. The spent lamp handling process according to claim 2 wherein the step of monitoring levels of mercury vapors within said enclosure involves continually sensing the air within said enclosure.

10. The spent lamp handling process according to claim 2 further including the step of recording the levels of mercury vapors within said enclosure.

11. The spent lamp handling process according to claim 10 wherein said recording step is accomplished automatically.

12. A process for handling spent mercury containing lamps to create non-toxic recyclable by-product materials therefrom, said process comprising the steps of:
    transporting a lamp crushing apparatus on a mobile vehicle to a site whereat mercury containing lamps are collected;
    loading the mercury containing lamps within a closed chamber defined by said lamp crushing apparatus;
    crushing the mercury containing lamps within the closed chamber to create non-toxic glass and metal particulates;
    extracting substantially all hazardous mercury vapors from said closed chamber during the crushing process; and
    filtering all of said hazardous mercury vapors extracted from said closed chamber, said filtering step creating a non-toxic recyclable by-product material from the hazardous mercury vapors extracted from said closed chamber.

13. The process for handling spent mercury containing lamps according to claim 12 wherein said vehicle is provided with an enclosure in which said closed chamber is mounted, and said process further includes the step of: monitoring and measuring levels of mercury vapors within the enclosure at least during crushing of the mercury containing lamps within the closed chamber.

14. The process for handling spent mercury containing lamps according to claim 12 further including the step of: collecting said non-toxic particulates of glass and metal after the lamps are crushed.

15. The process for handling spent mercury containing lamps according to claim 14 wherein the step of collecting said non-toxic particulates of glass and metal further involves the step of directing said particulates to either of two collection bins carried on said mobile vehicle.

16. The process for handling spent mercury containing lamps according to claim 12 wherein the step of filtering is effected through a filter apparatus including primary and secondary filters arranged in serial relation relative to each other.

17. The process for handling spent mercury containing lamps according to claim 16 further including the step of: monitoring and measuring levels of mercury vapors within said enclosure.

18. The process for handling spent mercury containing lamps according to claim 17 wherein the step of monitoring and measuring levels of mercury vapors is effected between said primary and secondary filters.

19. The process for handling spent mercury containing lamps according to claim 17 further including the step of: recording the levels of mercury vapors monitored within said enclosure.

20. The process for handling spent mercury containing lamps according to claim 17 further including the step of: recording the levels of mercury vapors measured between the primary and secondary filters.

21. A process for handling spent mercury containing lamps to create non-toxic recyclable by-product materials therefrom, said process comprising the steps of:

transporting a spent lamp processing apparatus within an enclosure on a mobile vehicle to a site whereat mercury containing lamps are collected;

processing the mercury containing lamps within said enclosure to create at least three non-toxic recyclable by-products therefrom, said processing step including extracting substantially all hazardous mercury vapors from said mercury containing lamps, said processing step further involving filtering all of said hazardous mercury vapors extracted from said mercury containing lamps, said filtering creating a non-toxic recyclable by-product material from the hazardous mercury vapors extracted from said mercury containing lamps; and storing the non-toxic recyclable materials on the vehicle such that after the spent lamps are processed at the site, the vehicle and the non-toxic by-product materials stored thereon are transported to another location leaving no materials from the processed lamps at the site or outside the vehicle.

22. The process for handling spent mercury containing lamps according to claim 21 further including the step of: monitoring and measuring levels of mercury vapors within the enclosure at least during the processing of the mercury containing lamps.

23. The process for handling spent mercury containing lamps according to claim 22 further including the step of: recording the levels of mercury vapors measured in said enclosure.

24. The process for handling spent mercury containing lamps according to claim 21 further including the step of: collecting non-toxic particulates of glass and metal after the lamps are processed.

25. The process for handling spent mercury containing lamps according to claim 24 wherein the step of collecting said non-toxic particulates of glass and metal further involves the step of directing said particulates to either of two collection bins carried on said mobile vehicle.

26. The process for handling spent mercury containing lamps according to claim 21 wherein the step of extracting substantially all hazardous vapors from said chamber is effected through a filter apparatus.

27. The process for handling spent mercury containing lamps according to claim 26 wherein said filter apparatus includes primary and secondary filters serially arranged relative to each other.

28. The process for handling spent mercury containing lamps according to claim 26 further including the step of monitoring and measuring levels of mercury vapors within said enclosure, said step of monitoring and measuring is effected between said primary and secondary filters.

29. A process for handling spent mercury containing lamps to create non-toxic recyclable by-product materials therefrom, said process comprising the steps of:

transporting a spent lamp processing apparatus on a mobile vehicle to a site whereat mercury containing lamps are collected;

crushing the mercury containing lamps within a closed compartment in an enclosure on the vehicle by directly pressing on and passively breaking the mercury containing lamps;

extracting substantially all hazardous mercury vapors from the compartment as the mercury containing lamps are crushed;

gravitationally receiving non-toxic glass and metal particulates created from the broken mercury containing lamps in a first storage area on the vehicle;

filtering all of said hazardous mercury vapors extracted from said closed compartment thereby creating a non-toxic by-product material from the hazardous mercury vapors extracted from said closed compartment; and monitoring and measuring levels of mercury vapors within the enclosure at least during the step of crushing of the mercury containing lamps.

30. The process for handling spent mercury containing lamps according to claim 29 further including the step of: recording the levels of mercury vapors measured during the crushing process.

31. The process for handling spent mercury containing lamps according to claim 29 wherein the step of gravitationally receiving non-toxic and metal particulates further involves directing said particulates to a second storage area on the vehicle.

* * * * *